April 7, 1970

R. B. GRIEVE ET AL 3,504,792

LIFT-TYPE INDUCED ROLL MAGNETIC SEPARATOR AND SEPARATION METHOD

Filed Dec. 4, 1967

INVENTORS
JAMES HALL CARPENTER
ROBERT B. GRIEVE
BY
ATTORNEYS

INVENTORS
JAMES HALL CARPENTER
ROBERT B. GRIEVE
BY Irons, Birch, Swindle & McKie
ATTORNEYS

INVENTORS
JAMES HALL CARPENTER
ROBERT B. GRIEVE
BY
ATTORNEYS

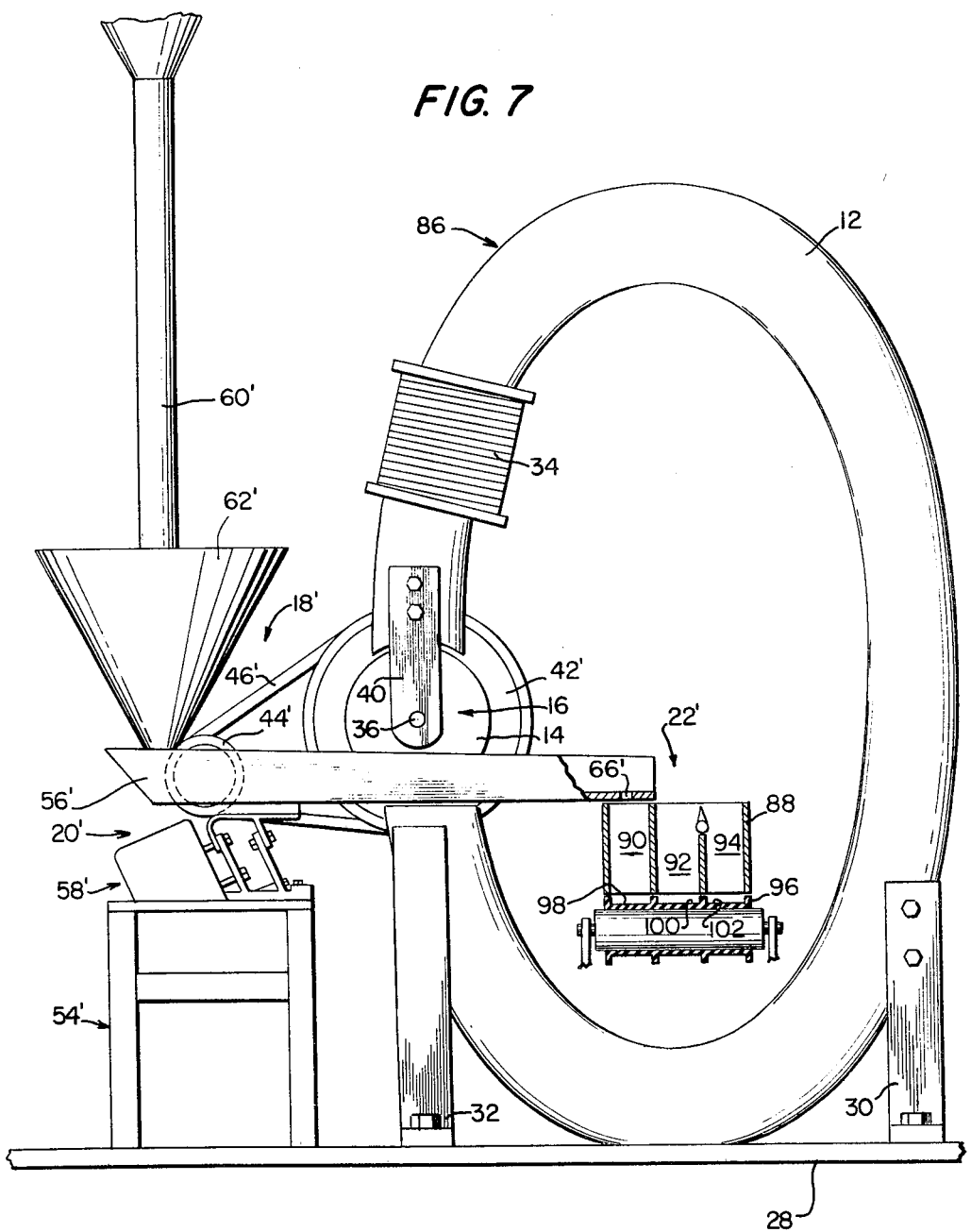

United States Patent Office 3,504,792
Patented Apr. 7, 1970

3,504,792
LIFT-TYPE INDUCED ROLL MAGNETIC SEPARATOR AND SEPARATION METHOD
Robert B. Grieve and James Hall Carpenter, Jacksonville, Fla., assignors to Carpco Research & Engineering, Inc., Jacksonville, Fla., a corporation of Florida
Filed Dec. 4, 1967, Ser. No. 691,680
Int. Cl. B03c 7/04
U.S. Cl. 209—214                                    11 Claims

ABSTRACT OF THE DISCLOSURE

A method and an apparatus for separating dry granular materials of differing magnetic susceptibility wherein the materials to be separated are vibratingly fed along a substantially horizontal path into proximity with the lower portion of an inductively magnetized, rotating rotor so that the material of relatively higher magnetic susceptibility will be attracted upwardly toward the rotor and be propelled outwardly therefrom along a path vertically inclined from said horizontal path while the material of relatively lower magnetic susceptibility continues to move along said horizontal path after passing from proximity with the rotor.

BACKGROUND OF THE INVENTION

Field of the invention

This invention relates to a method and an apparatus for separating dry granular ore constituents of differing magnetic susceptibility. Specifically, the invention concerns a magnetic separator and the separation process performed thereby wherein an inductively magnetized rotor is employed for separating material of relatively higher magnetic susceptibility from a mixture of materials of relatively higher and lower magnetic susceptibility.

Description of the prior art

Magnetic separators for separating dry granular ore constituents long have been known which employ rotating rotors, moving belts, rotating rings and the like, as evidenced by Cook Patent 6,121. Frequently such devices utilize a rotor having means disposed internally thereof for generating a magnetic field about the rotor, as exemplified by the apparatus disclosed in the aforementioned Cook patent. Also, roll-type magnetic separators are known in which the rotor is inductively magnetized by an externally generated field, such as that shown in Palasvirta et al. Patent 3,024,910. Generally, in roll-type magnetic separators employing either an internally or inductively magnetized rotor, the materials to be separated are fed along a vertically inclined path past and in close proximity to the rotor. The rotating magnetic field generated about the rotor alters the path of the maguetically susceptible material, permitting the materials of differing magnetic susceptibility to be separately collected.

Exemplary of the moving or cross-belt-type of magnetic separator is the apparatus shown in Conkling Patent 401,414. Generally, in devices of this nature, a magnetic field is generated at the juncture of one or more rtansversely disposed conveyor belts. The materials to be separated are carried by a first belt into the field where the magnetically susceptible material is attracted to and carried away by a second belt moving transversely of the first belt.

Other types of magnetic separators are known comprising various combinations of moving belts, rotating rings and rotors.

All of such prior magnetic separators, however, represent a compromise between high recovery rates and operating economy. For example, the prior induced roll magnetic separators generally are reasonably economical to operate but do not yield high recovery rates. Conversely, many of the moving belt and rotating ring separators yield high recovery rates but only at a substantial sacrifice of operating economy.

Thus, the ore benefication art long has needed a magnetic separator for separating dry granular ore constituents of differing magnetic susceptibility which is economical to operate and which yields high recovery rates. This need has been rendered particularly acute due to increasing industrial demands for large quantities of mineral ores which previously have been uneconomical to separate, such as monazite. Monazite is a phosphate of the cerium metals and thorium which is slightly magnetically susceptible and which in its naturally occurring state frequently is admixed with zircon, a nonmagnetically susceptible silicate of zirconium.

SUMMARY OF THE INVENTION

The present invention offers a solution to the long-felt need for an apparatus and a method for separating dry granular ore constituents in a highly efficient manner.

Generally described, the apparatus of the invention comprises; a substanially C-shaped magnet having a gap therein defined by substantially vertically opposed upper and lower pole faces, a magnetically permeable rotor mounted between the pole faces, driving means for rotating the rotor, means for vibratingly feeding the materials to be separated along a substantially horizontal path between the lower pole face and the rotor in close proximity to the lower portion of the rotor so that the material of relatively higher magnetic susceptibility will be attracted upwardly toward the rotor and be propelled outwardly therefrom along a path vertically inclined from said horizontal path while the material of relatively lower magnetic susceptibility continues to move along said horizontal path after passing from between the lower pole face and the rotor, and means for separately collecting the separated materials.

Basically, the method of the invention comprises, vibratingly feeding the materials to be separated along a substantially horizontal path into proximity with the lower portion of a substantially horizontally disposed, inductively magnetized, rotating rotor so that the material of relatively higher magnetic susceptibility will be attracted upwardly toward the rotor and be propelled outwardly therefrom along a path vertically inclined from said horizontal path while the material of relatively lower magnetic susceptibility continues to move along said horizontal path, and separately collecting the materials of relatively higher and lower magnetic susceptibility.

By imparting a vibratory motion to the materials to be separated as they are fed along a substantially horizontal path into proximity with the rotor, the materials are exposed to the effect of the induced magnetic field generated about the rotor in a manner such that an extremely efficient separation results.

With the foregoing in mind it is an object of the present invention to provide a highly efficient apparatus and method for separating dry granular ore constituents of differing magnetic susceptibility.

It is a further object of the invention to provide an apparatus and a method for separating dry granular ore constituents of differing magnetic susceptibility wherein the materials to be separated are vibratingly fed along a substantially horizontal path into proximity with an inductively magnetized rotating rotor.

It is also an object of the invention to provide an apparatus and a method for separating dry granular ore constituents of differing magnetic susceptibility wherein the materials to be separated are fed into proximity with a rotating rotor which is inductively magnetized by the magnetic field generated by a substantially C-shaped magnet.

These and other objects of the invention will become apparent from a consideration of the detailed description of two embodiments thereof given in connection with the following drawings.

BRIEF DESCRIPTION OF THE DRAWINGS

FIG. 7 is an elevational view of another embodiment of the magnetic separator of the invention;
FIG. 7 is an elevational view of another embodiment of the magnetic separator of the invention.

DESCRIPTION OF THE PREFERRED EMBODIMENTS

Figure 1:
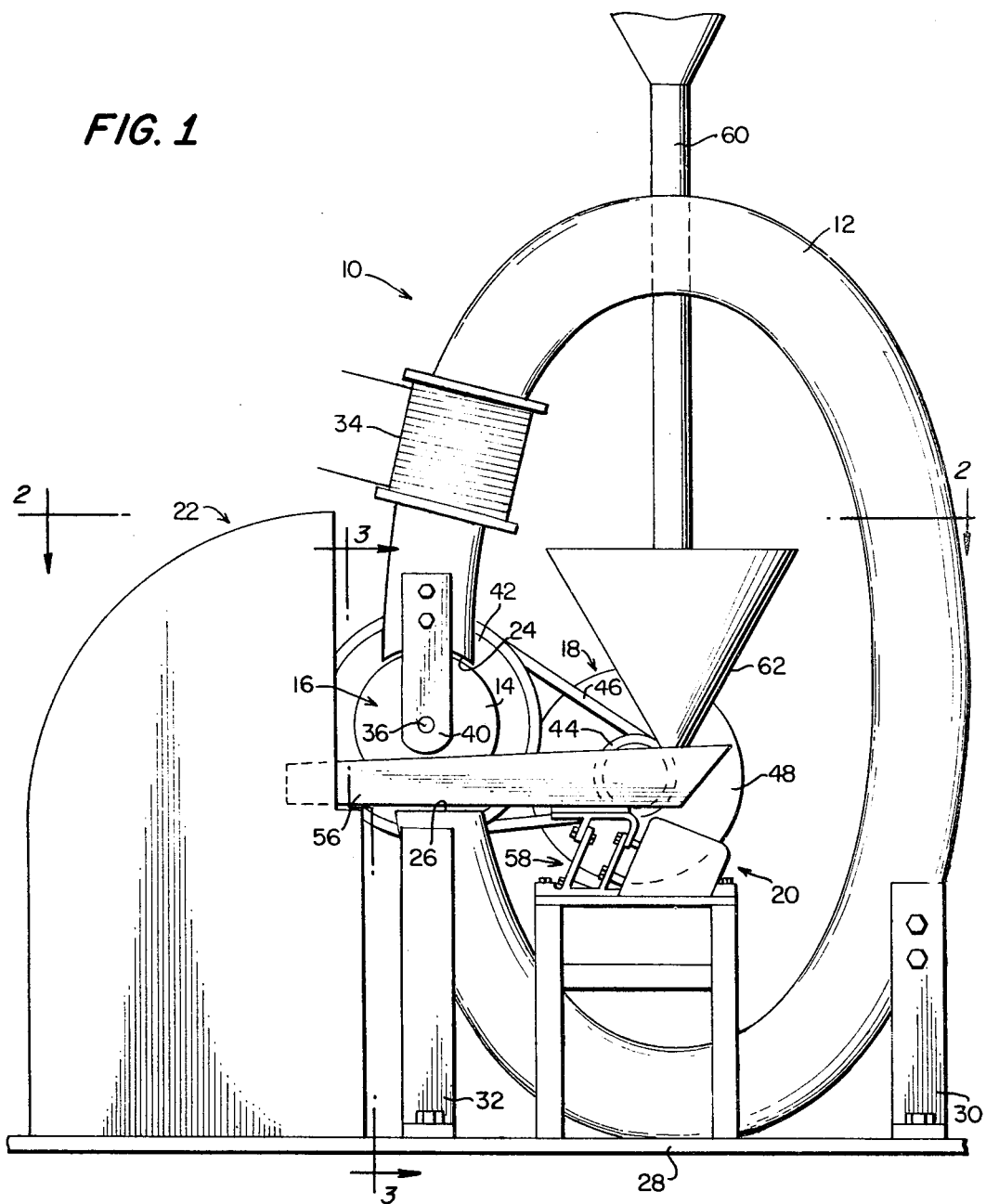

A first embodiment of the lift-type induced roll magnetic separator of the invention is designated in FIG. 1 by reference numeral 10. Separator 10 basically comprises a substantially C-shaped magnet 12, a separating rotor 14 disposed in a gap 16 formed in the magnet, driving means 18 for rotating the rotor, feeding means 20 for feeding the materials to be separated into proximity with the rotor, and collecting means 22 for separately collecting the separated materials.

As shown in FIG. 1, magnet 12 may be of a substantially toroidal configuration with gap 16 being defined therein by an upper pole face 24 and a lower pole face 26. Alternatively, the magnet may be of a substantially block C configuration, having straight top, bottom and side edges as opposed to the curved edges of magnet 12. The magnet is supported by a suitable framework, including a base 28 and vertical supports 30 and 32 connected between the sides of the magnet and the base. Magnet 12 is positioned on base 28 so that pole faces 24 and 26 are substantially vertically opposed to one another.

Except for the discontinuities at pole faces 24 and 26, the surface of magnet 12 has no sharp edges or corners where flux leakage might occur. Further, the magnet embodies a substantially toroidal shape which, as is well known, is an extremely efficient magnet shape. Thus, the strength of the magnetic field generated between pole faces 24 and 26 is maximized while flux losses are minimized.

Magnet 12 may be a permanent magnet but preferably is an electromagnet comprising a core made of a highly-magnetically permeable material, such as an alloy of iron, and one or more energizing coils 34 positioned adjacent gap 16 and connected to a suitable source of electricity. Conversely, base 28 and supports 30 and 32 preferably are made of a magnetically impermeable material, such as an alloy aluminum or stainless steel, so that the magnetic flux generated by the magnet will not escape through the supporting framework.

Rotor 14 is mounted in gap 16 to rotate about a substantially horizontal axis. The rotor is affixed to a horizontally disposed shaft 36 which is journalled in support arms 38 and 40. Arms 38 and 40 are attached to the sides of magnet 12 and preferably are made of a magnetically impermeable material to minimize flux losses therethrough.

Rotor 14 is made of a highly magnetically permeable material, such as an alloy of iron, and preferably is formed with a plurality of ridges 41 on the surface thereof which serve as convergence points for magnetic flux.

Figure 2:
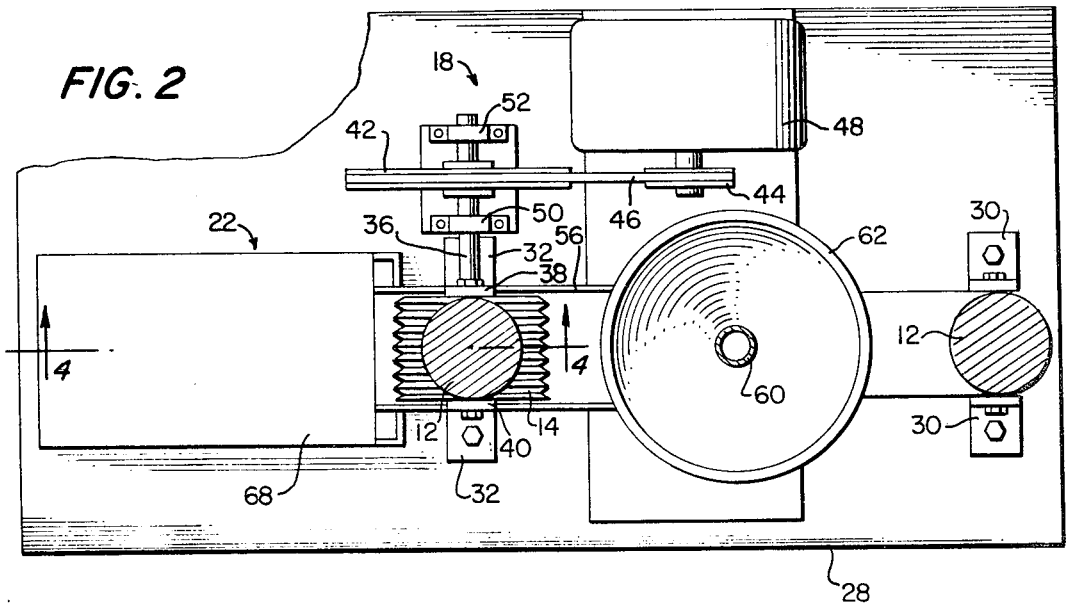
FIG. 2 is a sectional view taken on line 2—2 of FIG. 1.
Figure 3:
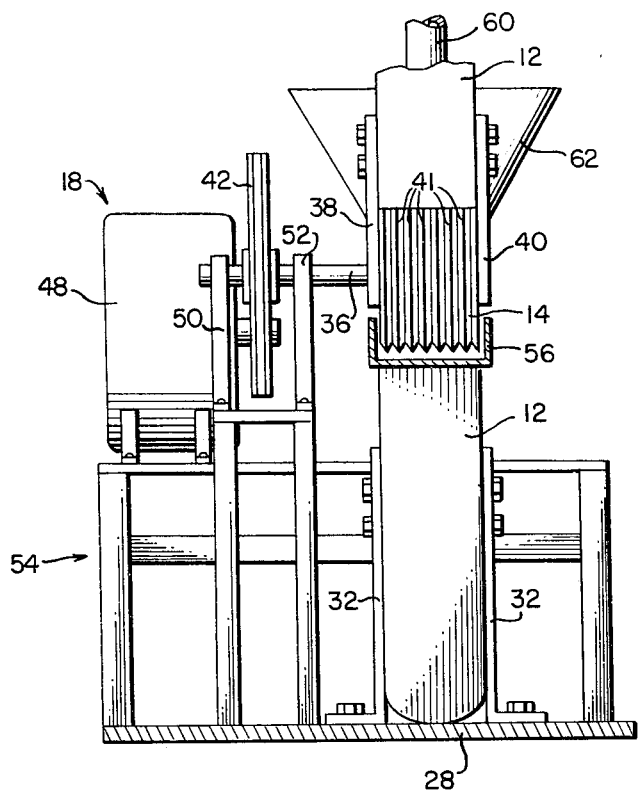
FIG. 3 is a sectional view taken on line 3—3 of FIG. 1.

Driving means 18 for rotating rotor 14 includes shaft 36, a driven pulley 42 affixed to the shaft, a driving pulley 44, a drive belt 46 trained about pulleys 42 and 44, and a motor 48 drivingly connected to pulley 44. As shown in FIGS. 2 and 3, shaft 36 extends laterally of arm 38 and is rotatably supported by a pair of bearing blocks 50 and 52, with driven pulley 42 being secured to the shaft intermediate the bearing blocks. While pulleys 42 and 44, and belt 46 are shown to comprise a V-belt driving transmission system, it is apparent that a chain and sprocket or gear transmission system could just as easily be employed for transmitting driving torque from motor 48 to rotor 14. As seen in FIG. 3, the elements comprising driving means 18 are mounted on a suitable supporting framework 54 above base 28.

Feeding means 20 for feeding the dry granular materials to be separated into proximity with the lower portion of rotor 14 comprises a substantially horizontally disposed tray 56 and means 58 for vibrating the tray. As shown in FIGS. 1–4, tray 56 extends outwardly from inside magnet 12, passing through gap 16 between lower pole face 26 and rotor 14, and terminates well outside the gap. The admixed ore constituents are delivered to tray 56 through a suitable input conduit 60, which passes through a hole in the top of magnet 12, and a conical delivery hopper 62; the latter emptying into the receiving end of tray 56.

Vibrating means 58 comprises a suitable electromechanical vibrator attached to the bottom of tray 56. When the vibrating means is energized, a vibratory motion is imparted to tray 56 which causes the particulate materials delivered to the tray to move along the bottom thereof in a substantially horizontal path from the receiving end of the tray toward gap 16. The tray preferably is made of a magnetically impermeable material so that it will not affect the separation process which occurs as the materials pass through the gap.

Figure 4:
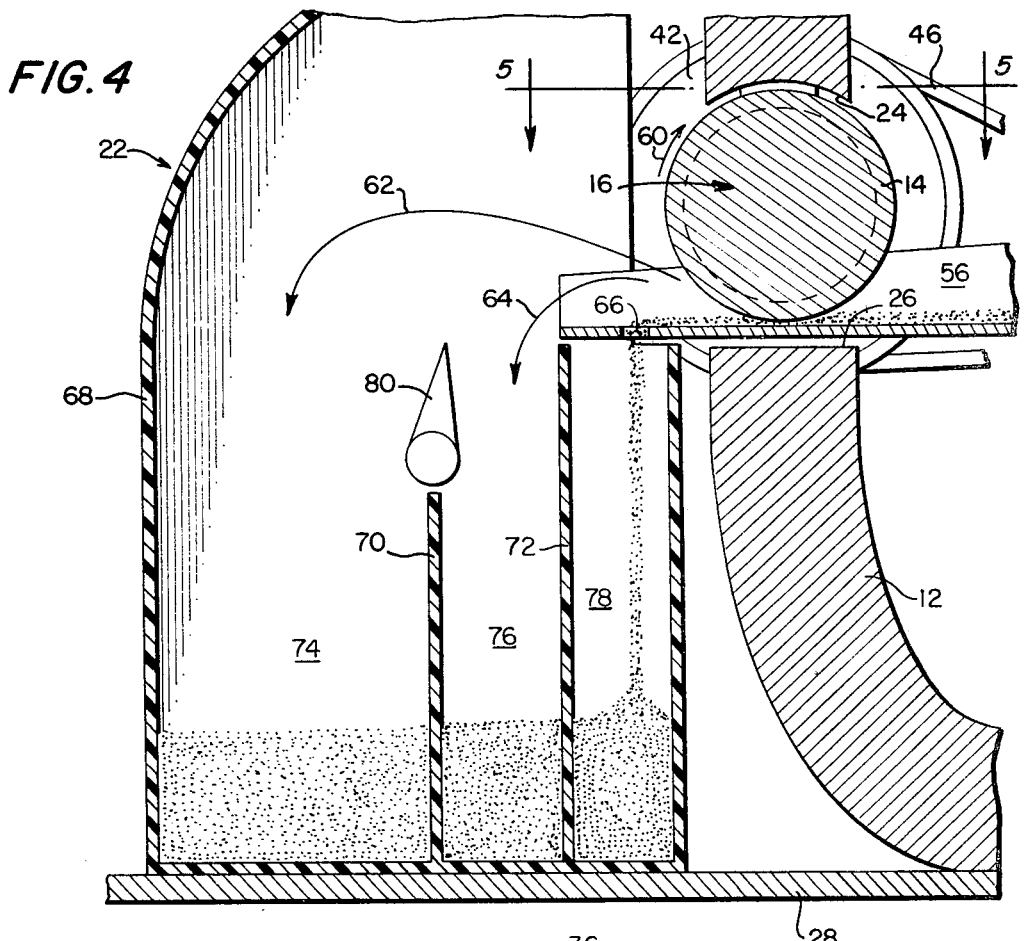
FIG. 4 is a sectional view taken on line 4—4 of FIG. 2.
Figure 5:
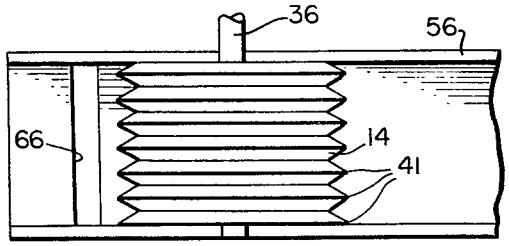
FIG. 5 is a sectional view taken on line 5—5 of FIG. 4.

Referring particularly to FIG. 4, it will be seen that as the materials to be separated move into gap 16, they pass in close proximity to the lower portion of rotor 14. The rotor is inductively magnetized by the magnetic field generated between pole faces 24 and 26 by magnet 12, and is rotated in the direction indicated by arrow 60 by driving means 18. Thus, a rotating induced magnetic field is generated about rotor 14.

As the materials pass under the rotor, the material or materials of relatively higher magnetic susceptibility are attracted upwardly from tray 56 toward the rotor by the rotating induced field generated thereabout. These materials are then propelled outwardly away from the rotor along paths vertically inclined from the substantially horizontal path defined by tray 56, for example along the paths indicated by arrows 62 and 64. The magnetically susceptible particles need not, and preferably do not, actually contact the surface of rotor 14 but rather are propelled outwardly therefrom by the rotating induced field before they reach the rotor surface. This result is obtained by appropriately adjusting the speed of rotor 14 in relation to the strength of the field generated by magnet 12, so that the centrifugal force acting on the particles overcomes the magnetic attraction force acting thereon before the particles reach the rotor surface. As mentioned above, ridges 41 on the surface of the rotor provide convergence points for magnetic flux, and thus the strength of the induced field is intensified therealong.

The nonmagnetically susceptible materials move through gap 16 along the substantially horizontal path defined by tray 56, and pass in close proximity with the lower portion of rotor 14 without being affected by the induced field generated about the rotor. After passing from proximity with the lower portion of the rotor and from between the rotor and lower pole face 26, such materials fall through a slot 66 formed in the bottom of tray 56.

As illustrated in FIG. 4, separator 10 may be employed for performing not only a two-fraction separation, but a three-fraction separation as well. For example, an efficient three-fraction separation may be performed on a mixture of ore constituents comprising a material of high magnetic susceptibility, a material of slight magnetic susceptibility and a nonmagnetically susceptible material. The material of higher magnetic susceptibility will be most affected by the rotating induced magnetic field and will be propelled away from the rotor along a path such as that indicated by arrow 62. The material of slight magnetic susceptibility will be less affected by the rotating induced field and will be propelled away from the rotor along a path such as that indicated by arrow 64. And, the nonmagnetically susceptible material will be unaffected by the induced field and will fall through slot 66 in the bottom of the tray.

Collecting means 22 for separately collecting the separated materials may comprise an internally partitioned receptacle such as receptacle 68. Receptacle 68 includes internal partitions 70 and 72 which divide the receptacle into a plurality of compartments 74, 76 and 78, and which may function as splitter plates as well. Receptacle 68 also preferably includes an adjustable splitter plate 80 positioned above partition 70 between compartments 74 and 76. As shown in FIG. 4, the partitions and external walls of receptacle 68 are of appropriate heights to permit the receptacle to be positioned at the discharge end of tray 56 adjacent rotor 14.

When separator 10 is employed to perform a three-fraction separation, the material of higher magnetic susceptibility is received by the compartment most distant from rotor 14, such as compartment 74; whereas the material of slight magnetic susceptibility is received by a compartment less distant from the rotor, such as compartment 76; and the nonmagnetically susceptible material is received by the compartment closest to the rotor and disposed under slot 66, such as compartment 78. Splitter plate 80 may be adjusted to further regulate the composition of the fractions received by compartments 74 and 76.

Figure 6:
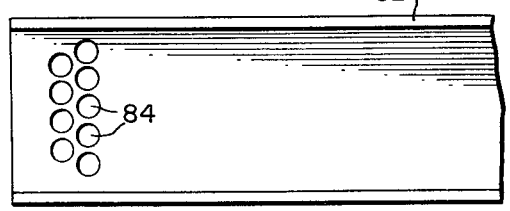
FIG. 6 is a partial plan view of a modified tray which may be employed in the feeding means of the separator shown in FIGS. 1–5.

A modified tray 82 is shown in FIG. 6 which may be employed in separator 10 instead of tray 56. Tray 82 has a plurality of holes 84 in the bottom thereof through which nonmagnetically susceptible material falls after passing from proximity with the lower portion of rotor 14. The longitudinal projections of holes 84 transversely overlap each other so that the openings defined by the holes encompass the entire width of the tray bottom.

Separator 10 provides an apparatus and a method for separating dry granular ore constituents of differing magnetic susceptibility in which the desirable characteristics of high recovery rates and economical operation are combined. Two features which particularly contribute to the high efficiency of the separator are the vibratory feeding means and the substantially horizontal feed path.

By feeding the materials along a substantially horizontal path the influence of gravity on the feed rate may be minimized, permitting the feed rate to be adjusted to produce the most efficient separation.

The advantage of employing a vibratory feeding means resides in the fact that the vibratory motion imparted to the materials includes a vertical as well as a horizontal velocity component. Thus the materials actually "bounce" or "jump" along the substantially horizontal path defined by the tray. This action prevents the materials of greater density from becoming stratified and entrapped on the tray below the materials of lesser density, and thus insures that all of the materials will be subjected substantially equally to the influence of the rotating induced field generated about rotor 14.

Another embodiment of the magnetic separator of the invention is designated in FIG. 7 by reference numeral 86. Separator 86 is generally similar to separator 10 except that in the previously described embodiment the materials to be separated were fed from inside the magnet along a substantially horizontal feed path toward the outside thereof, while in the presently described embodiment the direction of feeding is reversed. Thus, similarly to separator 10, separator 86 includes a substantially toroidal-shaped magnet 12 having a gap 16 formed therein, a rotor 14 mounted in the gap, and a suitable framework for supporting the magnet, such as base 28 and supports 30 and 32. These and the other elements of separator 86 which are identical to the corresponding elements of separator 10 are identified by like reference numerals.

As distinguished from separator 10, however, in separator 86 the driving means for rotating the rotor and the feeding means for feeding the materials to be separated into proximity with the lower portion of the rotor are positioned outside of the magnet, and the collecting means for separately collecting the separated materials is disposed inside the magnet. These components of separator 86 are designated in FIG. 7 by reference numerals 18', 20' and 22', respectively. Driving means 18' and feeding means 20' of separator 86 are in all other respects identical to driving means 18 and feeding means 20 of separator 10. Thus, the elements of driving means 18' and feeding means 20' are identified in FIG. 7 by like primed reference numerals.

Collecting means 22' of separator 86, however, is substantially dissimilar from collecting means 22 of separator 10. Collecting means 22' comprises an internally partitioned framework 88 defining a plurality of compartments 90, 92 and 94. As shown in FIG. 7, framework 88 is open at the top and bottom.

The ore constituents separated by the rotating magnetic field generated about rotor 14, fall into framework 88 and pass directly therethrough to be deposited on a conveyor belt 96. Belt 96 has a plurality of longitudinal ribs on the surface thereof which divide the belt into a plurality of longitudinal compartments 98, 100 and 102. Belt compartments 98, 100 and 102 are disposed below open framework compartments 90, 92 and 94, respectively, for receiving the separated materials after they have passed through the framework. The material of higher magnetic susceptibility falls into and through compartment 94 and is received by belt compartment 102, while the slightly magnetically susceptible material falls into and through compartment 92 and is received by belt compartment 100, and the nonmagnetically susceptible material falls into and through compartment 90 and is received by belt compartment 98. Conveyor belt 96 continuously transports the separated materials from within magnet 12 to storage bins, shipping drums, or other suitable containers.

As will be evident, the separation preformed by separator 86 is identical in all material respects to the highly efficient separation preformed by separator 10, embodying all of the operational advantages thereof.

While two specific embodiments of the apparatus of the invention have been described with particularity, it is recognized that various modifications thereof will occur to those skilled in the art. Therefore, the scope of the invention is to be limited solely by the scope of the claims appended hereto.

We claim:

1. An apparatus for separating dry granular materials of differing magnetic susceptibility comprising:
 a substantially C-shaped magnet having a gap therein defined by substantially vertically opposed upper and lower pole faces, said magnet being operative to generate a magnetic field between said faces;
 a magnetically permeable rotor rotatably mounted between the pole faces, said rotor being inductively magnetized by the magnetic field generated between said faces;
 driving means for rotating said rotor;
 means for vibratingly feeding the materials to be separated along a substantially horizontal path between the lower pole face and the rotor in close proximity to the lower portion of the rotor, said feeding means being operable to impart to said materials a vibratory motion having a vertical as well as a horizontal velocity component so that the materials will not become stratified on said feeding means, whereby the material of relatively higher magnetic susceptibility is attracted upwardly toward said rotor and is propelled outwardly therefrom along a path vertically inclined from said horizontal path while the material of relatively lower magnetic susceptibility continues to move along said horizontal path after passing from between the lower pole face and the rotor; and means for separately collecting the materials of relatively higher and lower magnetic susceptibility.

2. The apparatus as recited in claim 1, wherein said magnet is substantially toroidal-shaped.

3. The apparatus as recited in claim 1, wherein said magnet is an electromagnet having a metallic core and at least one energizing coil disposed about said core adjacent the gap defined by the pole faces.

4. The apparatus as recited in claim 3, wherein said core is made of an iron alloy.

5. The apparatus as recited in claim 1, wherein said feeding means comprises: a substantially horizontally disposed tray extending between said lower pole face and said rotor, and means for vibrating said tray.

6. The apparatus as recited in claim 5, wherein said tray is made of a nonmagnetically permeable material.

7. The apparatus as recited in claim 5, wherein said tray extends beyond said lower pole face and said rotor in the direction of feeding materials therebetween and has an opening in the bottom thereof through which the material of relatively lower magnetic susceptibility falls for separate collection after passing from between the lower pole face and the rotor.

8. The apparatus as recited in claim 1, wherein said rotor has a plurality of ridges formed on the surface thereof.

9. The apparatus as recited in claim 1, wherein said collecting means includes a plurality of compartments for receiving the separated materials and at least one splitter plate for directing the separated materials into said compartments.

10. A method for separating dry granular materials of differing magnetic susceptibility comprising:

vibratingly feeding the materials to be separated along a substantially horizontal path into proximity with the lower portion of a substantially horizontally disposed, inductively magnetized, rotating rotor, said feeding including imparting to said materials a vibratory motion having a vertical as well as a horizontal velocity component so that the materials will not become stratified during said feeding, whereby the material of relatively higher magnetic susceptibility is attracted upwardly toward said rotor and is propelled outwardly therefrom along a path vertically inclined from said horizontal path while the material of relatively lower magnetic susceptibility continues to move along said horizontal path; and separately collecting the materials of relatively higher and lower magnetic susceptibility.

11. A method as recited in claim 10, wherein said material of relatively higher magnetic susceptibility is monazite.

References Cited

UNITED STATES PATENTS

| | | | |
|---|---|---|---|
| 248,196 | 10/1881 | Muller | 209—219 |
| 1,114,071 | 10/1914 | Ullrich | 209—219 |
| 1,543,534 | 6/1925 | Ullrich | 209—219 X |
| 1,576,690 | 3/1926 | Ullrich | 209—225 X |
| 1,956,760 | 5/1934 | Forrer | 209—223 |
| 2,694,223 | 11/1954 | Stem | 209—223 X |
| 3,024,910 | 3/1962 | Palasvirta et al. | 209—219 |
| 3,033,369 | 5/1962 | Kragle | 209—225 X |
| 698,311 | 4/1902 | McPhee | 209—225 X |
| 1,061,666 | 5/1913 | Freese | 209—219 |
| 2,268,128 | 12/1941 | Reeves | 209—219 |

FOREIGN PATENTS 326,223    3/1930    Great Britain.

TIM R. MILES, Primary Examiner

U.S. Cl. X.R.

209—219, 225, 231